(12) United States Patent
McDonald et al.

(10) Patent No.: US 7,021,083 B2
(45) Date of Patent: Apr. 4, 2006

(54) MANUFACTURE OF HIGH PURITY GLASS TUBES

(75) Inventors: Thomas E. McDonald, Acworth, GA (US); Fengqing Wu, Duluth, GA (US)

(73) Assignee: Fitel USA Corp., Norcross, GA (US)

( * ) Notice: Subject to any disclaimer, the term of this patent is extended or adjusted under 35 U.S.C. 154(b) by 638 days.

(21) Appl. No.: 10/353,354

(22) Filed: Jan. 29, 2003

(65) Prior Publication Data
US 2004/0144134 A1    Jul. 29, 2004

(51) Int. Cl.
*C03B 37/018* (2006.01)

(52) U.S. Cl. .............. 65/404; 65/23; 65/414; 65/433; 65/427

(58) Field of Classification Search .......... 65/414, 65/23, 404, 433, 427
See application file for complete search history.

(56) References Cited

U.S. PATENT DOCUMENTS

| | | | |
|---|---|---|---|
| 2,272,342 A * | 2/1942 | Hyde .......... | 65/21.5 |
| 4,062,665 A | 12/1977 | Izawa et al. | |
| 4,191,545 A | 3/1980 | MacChesney et al. | |
| 4,648,891 A * | 3/1987 | Abe .......... | 65/412 |
| 4,775,401 A | 10/1988 | Fleming et al. | |
| 5,182,052 A | 1/1993 | Lydtin et al. | |
| 5,281,248 A * | 1/1994 | Barish et al. .......... | 65/414 |
| 5,294,237 A * | 3/1994 | Mizuno et al. | |
| 5,429,653 A | 7/1995 | Leber et al. | |
| 5,667,547 A * | 9/1997 | Christiansen et al. | |
| 5,769,921 A * | 6/1998 | Yokokawa et al. | |
| 5,827,346 A * | 10/1998 | Kopylov et al. | |
| 5,837,334 A * | 11/1998 | Yokokawa et al. | |
| 6,131,415 A | 10/2000 | Chang et al. | |
| 6,236,797 B1 * | 5/2001 | Hotta et al. | |
| 6,405,563 B1 * | 6/2002 | Nagata et al. | |
| 6,669,892 B1 * | 12/2003 | Ganguli et al. | |
| 6,898,359 B1 * | 5/2005 | Soljacic et al. | |
| 2002/0157425 A1 * | 10/2002 | Werner et al. | |
| 2003/0070451 A1 * | 4/2003 | Ouellet et al. | |
| 2005/0109065 A1 * | 5/2005 | Ichii et al. | |

OTHER PUBLICATIONS

H. Murata, Recent Developments in Vapor Phase Axial Deposition, Journal of Lightwave Technology, v. LT-4, No. 8 (Aug. 1986).

* cited by examiner

*Primary Examiner*—John Hoffmann
(74) *Attorney, Agent, or Firm*—Law Office of Leo Zucker; Michael A. Morra

(57) ABSTRACT

A glass tube for use in an optical fiber preform is produced by applying a first soot on an end face of a starting member to form an elongated, porous cylindrical soot core having a first density, and applying a second soot including $SiO_2$ on the periphery of the soot core to form a porous soot cladding having a second density greater than that of the soot core at the periphery of the core. The core and the cladding are later heated together at a temperature sufficient for sintering to form a core glass and a cladding glass. Because the soot core collapses at a greater rate than the soot cladding during sintering, the core glass separates or delaminates radially from the cladding glass. The core glass is then removed from the surrounding cladding glass, and the latter is treated to provide a high purity glass tube suitable for use as part of an optical fiber preform.

12 Claims, 3 Drawing Sheets

MANUFACTURE OF HIGH PURITY GLASS TUBES

BACKGROUND OF THE INVENTION

1. Field of the Invention

This invention is directed to fabrication of high purity glass tubes that can be used for producing low loss optical fibers.

2. Discussion of the Known Art

Production of optical fiber to be used for data or other information transmission, is typically accomplished by drawing the fiber with the aid of gravity from an axial end of a cylindrical glass preform. The preform is supported vertically in the axial direction inside a furnace and is heated at temperatures typically about 2100 degrees C. or higher, thus causing a molten glass drop to form at the lower end of the preform from which the fiber is drawn. For low transmission loss, particularly at wavelengths around 0.95 microns ($\mu$), it is known that the glass of which the preform is made should have an OH concentration of less than 1 ppb ($1 \times 10^{-9}$), with non-detectable transition metal content. Absent such high purity glass including, for example, F-doped, Ge-doped, and undoped silica glass preform tubes, certain desirable fiber transmission characteristics cannot be attained.

U.S. Pat. No. 5,182,052 (Jan. 26, 1993) discloses a method of making quartz glass tubes which, according to the patent, are of optical waveguide quality. A tubular mold is rotated about its axis, and a liquid binder is deposited on the inner wall of the rotating mold. A powder material including $SiO_2$ is deposited over the binder, and the rotational speed of the mold is increased subjecting the powder material to centrifugal force and causing it to form a solid cylindrical "green body". The green body is then removed from the mold, dried, and heated to form a glass tube.

A process for making glass tubes to be used as optical fiber preforms is disclosed in U.S. Pat. No. 4,191,545 (Mar. 4, 1980). Amorphous powdery particles are deposited via an oxidizing burner along the length of a cylindrical mandrel which is rotated about its axis. The particles form a porous intermediate tubular structure which is then cooled, removed from the mandrel and fused into a transparent glass tube. Additional material is then deposited on the inner portion of the tube as in a conventional modified chemical vapor deposition (MCVD) process, to yield a preform from which an optical fiber is drawn.

Optical fibers may also be produced by a so-called vapor phase axial deposition (VAD) method which does not at the outset require a high purity glass tube. See U.S. Pat. No. 4,062,665 (Dec. 13, 1977) all relevant portions of which are incorporated by reference. Basically, in VAD, a vertically suspended rod of silica acts as a "seed" wherein a core soot is initially deposited from a flame of a core soot burner onto a confronting axial end face of the rod. The rod is rotated about its axis and, as the soot deposition increases, the rod is moved vertically upward so as to maintain the axial end surface of the core soot at a constant level with respect to the core soot burner. As the rod continues to move upward a cladding soot burner has its flame directed onto the outer surface of the core soot, and the flame deposits a cladding soot which builds outward by a desired radial thickness beyond the core soot. A porous cylindrical soot structure of a desired length and refractive index profile is obtained, and the structure is then heated at a high temperature in a furnace for vitrification into a preform having a transparent glass core and cladding.

See also U.S. Pat. No. 5,281,248 (Jan. 25, 1994) and No. 6,131,415 (Oct. 17, 2000), and H. Murata, Recent Developments in Vapor Phase Axial Deposition, Journal of Lightwave Technology, vol. LT-4, No. 8 (August 1986) at pages 1026–33; all relevant portions of which are incorporated by reference. As far as is known, high purity glass tubes to be used in the production of optical fiber preforms have not been fabricated using a procedure the same as or similar to the VAD process described above.

SUMMARY OF THE INVENTION

According to the invention, a method of producing a glass tube includes providing a starting member having an axis and arranged for deposition of a glass soot at an axial end of the member, and applying a first soot on the end of the starting member in such a manner as to form an elongated cylindrical soot core having a first density. A second soot including $SiO_2$ is applied on the circumference of the soot core so as to form a soot cladding that surrounds the soot core. At least part of the soot cladding has a second density that is greater than the first density of the soot core. The soot core and the surrounding soot cladding are later heated at a temperature sufficient for sintering the soot core and the soot cladding into a core glass and a cladding glass, wherein the core glass collapses at a greater rate than the cladding glass and the core glass separates radially from the cladding glass. The core glass is removed from the cladding glass and the cladding glass is treated to provide a glass tube suited for use in an optical fiber preform.

For a better understanding of the invention, reference is made to the following description taken in conjunction with the accompanying drawing and the appended claims.

DETAILED DESCRIPTION OF THE INVENTION

Figure 1:
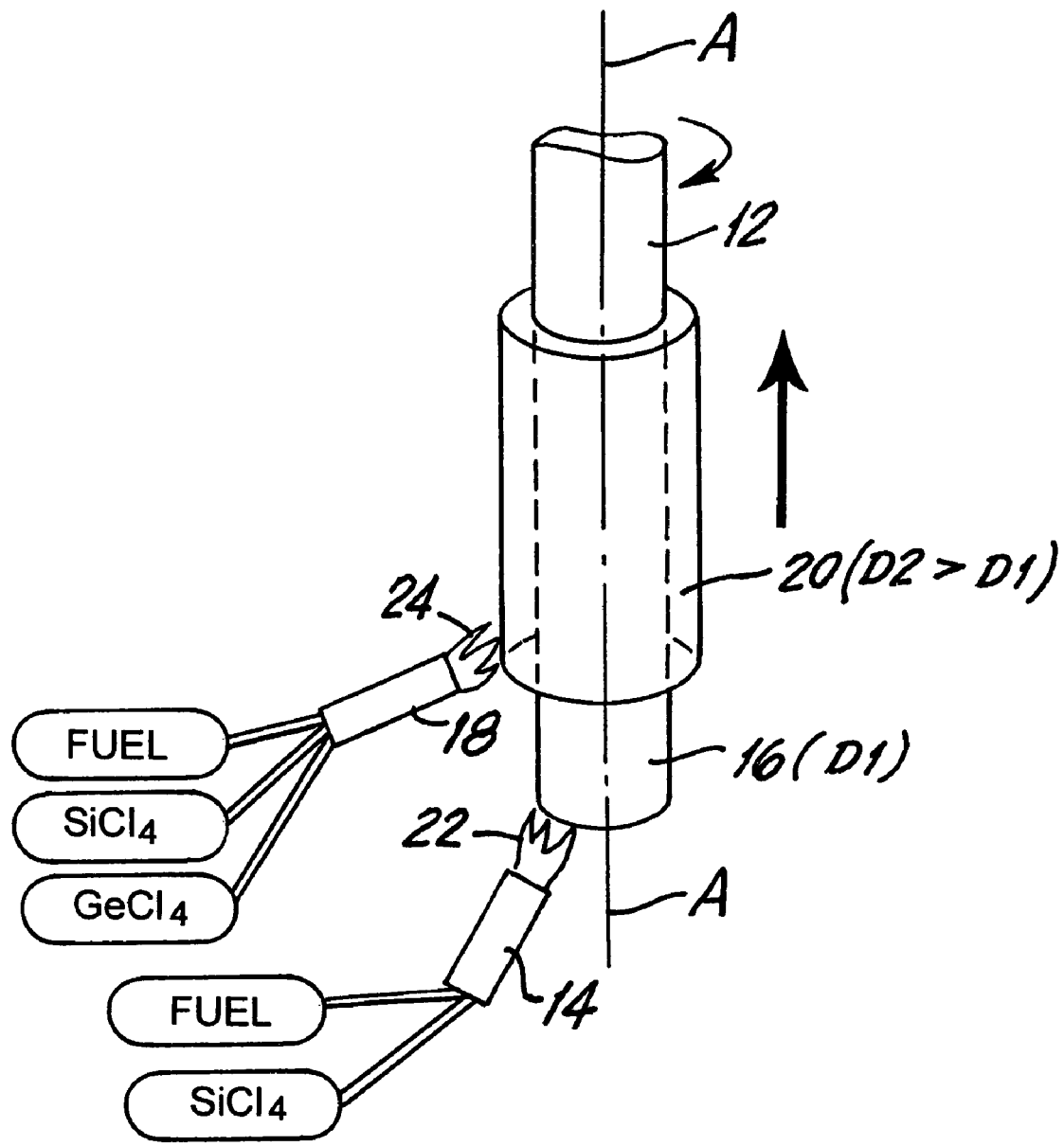
FIG. 1 illustrates a vapor phase axial deposition (VAD) process that is modified according to the invention to fabricate a high purity glass tube.

FIG. 1 is a schematic representation of a process for fabricating a high purity glass tube suited for use in an optical fiber preform, according to the invention. An initial mechanical set up for the present process may be the same as or similar to that used in the conventional VAD method of preform fabrication described above.

A starting member 12 in the form of, e.g., a quartz seed rod is supported vertically along the direction of its axis A. The member 12 is arranged for rotation about the axis A as well as for controlled upward vertical movement, as in typical VAD processes. A core torch 14 is arranged to direct a corresponding flame toward the lower axial end of the starting member 12. A porous soot core 16 begins to form on the axial end of the starting member 12, and the soot core 16 continues building on itself to form a cylindrical rod that is substantially axially aligned with member axis A as the member 12 rotates and is advanced upward. The vertical movement of the member 12 may be controlled, for example, by directing a laser light beam just below the axial end surface of the developing soot core 16, and causing the member 12 to advance upward at a rate just sufficient to avoid the light beam from being blocked by the lower end surface of the soot core 16. A cladding torch 18 is set to direct its flame toward the periphery of a developed portion of the soot core 16, and the torch flame develops a soot cladding 20 substantially coaxial with the soot core 16 while the soot core is being rotated and moved upward by the starting member 12.

Each of the torches 14, 18 may be conventional oxy-hydrogen torches, producing corresponding flames 22, 24 that are fueled by oxygen and hydrogen in such a manner as to control temperatures attained in reaction zones of the flames. Precursor gases comprising, e.g., $SiCl_4$ and $GeCl_4$ may be supplied to the cladding torch 18 for reaction in the flame 24 to form the soot cladding 20 of silica with a desired amount of Ge doping. The precursor gas for the cladding torch 18 may be only $SiCl_4$ if the soot cladding is to be formed of pure silica alone. Likewise, a precursor gas of only $SiCl_4$ may be supplied to the core torch 14 for reaction in the flame 22 to form the soot core 16 of pure silica.

Figure 2:
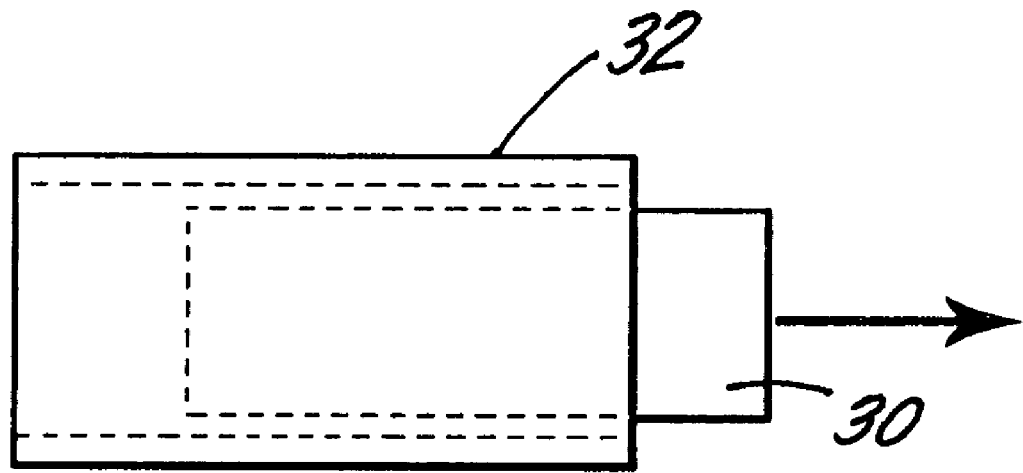
FIG. 2 shows a step of removing a sintered soot core produced during the process of FIG. 1 from inside a sintered soot cladding.
Figure 3:
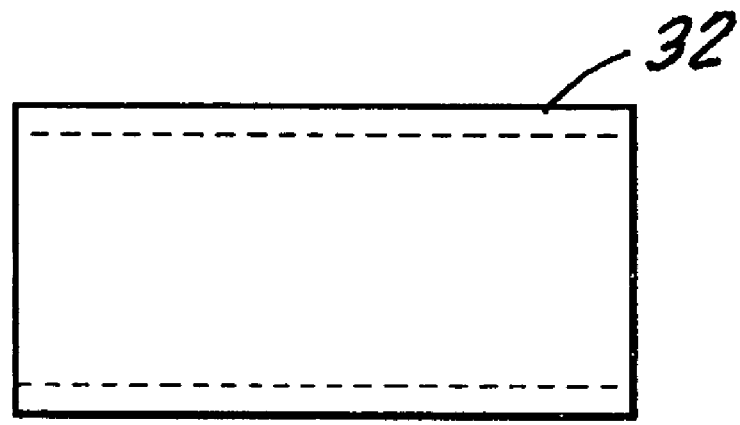
FIG. 3 shows the glass tube provided after removing the core in FIG. 2.
Figure 4:
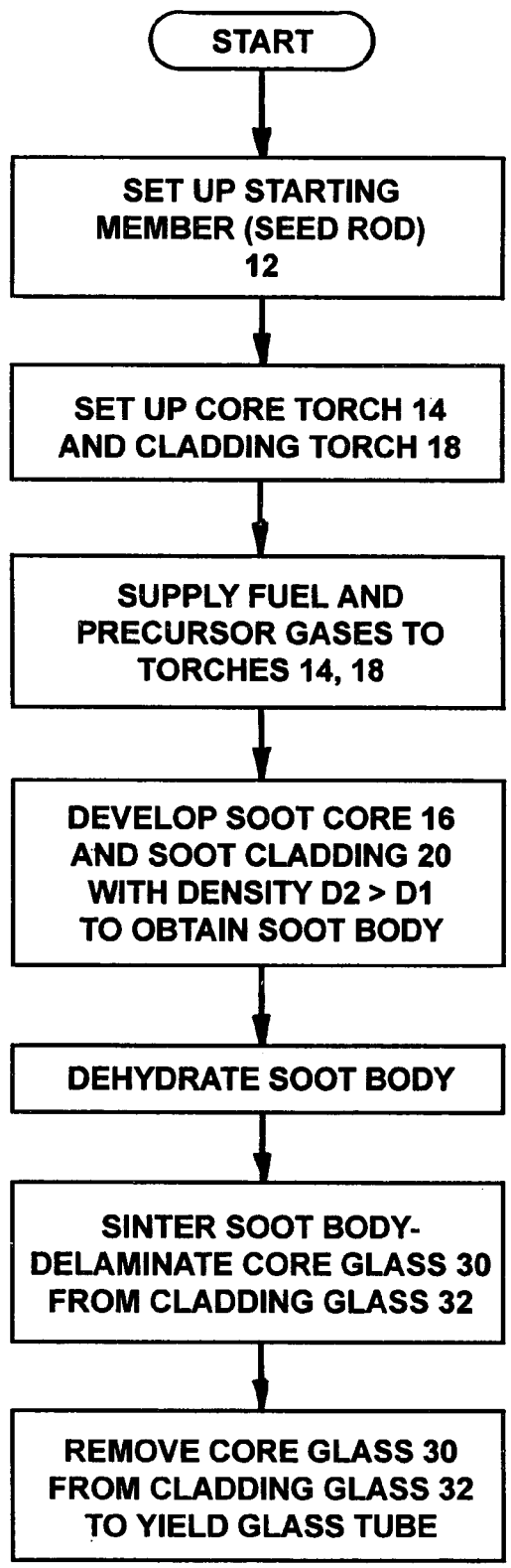
FIG. 4 is a flow chart showing steps taken according to the invention.

It has been discovered that a delamination or separation at the circumferential boundary between the soot core 16 and the soot cladding 20 may be induced under certain conditions, when the core and the cladding are later sintered or vitrified to form a core glass 30 and a cladding glass 32 which are shown in FIGS. 2 and 3. Specifically, to facilitate such separation, the density D1 (see FIG. 1) of the porous soot core 16 must be lower than the density D2 of the soot cladding 20. The densities D1, D2 are determined according to the concentration and rate of delivery of each of the precursor gases to the corresponding torches 14, 18. For example, the soot core 16 may be established with a density of 0.3 g/cc, while at least that part of the soot cladding 20 which is in immediate contact with the outer circumference of the soot core is caused to develop with a density of 0.4 g/cc or higher. At radial positions further outward from the periphery of the soot core 16 the density of the soot cladding 20 may be graded downward, including to such a degree that the average density of the soot cladding 20 becomes less than that of the soot core 16. Such downward grading of the soot cladding density may even facilitate subsequent sintering and help to avoid cracking. It is important, however, that the density of the soot cladding 20 be greater than that of the soot core 16 in the vicinity of the boundary between the core 16 and the cladding 20. It is also important that sintering be carried out at a relatively high rate, as described below.

Dehydration

Once a porous soot body comprised of the flame deposited soot core 16 and soot cladding 20 of desired axial length is obtained, the body is preferably dehydrated before sintering. For example, the soot body is treated at approximately 1200 degrees C. with both chlorine and helium gases for up to one hour. The chlorine concentration is typically in the range of zero to 10%, and is determined in a known manner based on specific requirements.

Sintering (Vitrification)

After the dehydration step, the dehydrated soot body is sintered into a transparent glass at a temperature of up to approximately 1600 degrees C., by passing the soot body through a hot zone at a traverse rate in the range of about 1 to 15 mm/min. Because a soot having a lower density and a higher specific surface area will collapse faster than a soot having a higher density and a lower specific surface area, the core glass 30 of the sintered soot body separates or delaminates from the cladding glass 32 during the sintering step. The sintered body is cut transversely near both axial ends and the core glass 30 in the form of a small glass rod is removed, leaving a bore in the central region of the body to form the glass tube 32. The glass tube 32 may then be treated by grinding and by smoothing its inside surface, and by re-shaping (stretching typically), in order to satisfy specific requirements before the tube 32 is used as part of a preform from which an optical fiber will later be drawn.

A relatively large reduction in the refraction index of the glass tube 32 can be achieved by incorporating a conventional fluorine doping process for the tube 32 during the sintering step. Since the central core glass 30 will eventually be removed, a "brute force" method may be used to add sufficient fluorine into the soot cladding to achieve a desired F doping level in the cladding glass 32.

It will be appreciated that the present process enables fabrication of relatively large size optical fiber preforms of high quality and at a low cost. Glass tubes fabricated by the present process may be used to form outer regions of optical fiber cores (e.g., so-called "trenches" defined in the cores of high quality single mode fibers), or inner regions of claddings used in premium fiber products. Preforms using glass tubes made by the present process are well suited for drawing of low-loss, long haul transmission fibers (e.g., ocean fiber products having losses <0.170 dB/km, and metro market non-zero dispersion shifted fiber (NZDF) with zero OH concentration).

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of fabricating a glass tube, comprising:

providing a starting member having an axis and arranged for deposition of a soot at a given axial end of the member;

applying a first soot on the end of the starting member in such a manner as to form an elongated cylindrical soot core having a first density and which is substantially axially aligned with the starting member;

applying a second soot including $SiO_2$ on the circumference of the soot core in such a manner as to form a soot cladding that surrounds the soot core, and at least a portion of the soot cladding in the region of the periphery of the soot core has a second density greater than the first density of the soot core, thus obtaining a porous soot body of a desired axial length;

heating the soot body at a temperature sufficient for sintering the soot core and the soot cladding into a core glass and a cladding glass, wherein the core glass collapses at a greater rate than the cladding glass and the core glass separates radially from the cladding glass; and removing the core glass from inside the cladding glass to yield a glass tube.

2. The method of claim 1, including dehydrating the soot body prior to sintering the soot body into said core glass and said cladding glass.

3. The method of claim 1, including applying the second soot on the soot core in such a manner as to obtain a desired amount of Ge doping in the cladding glass.

4. The method of claim 1, including adding a determined concentration of fluorine to the soot cladding during sintering to obtain a desired amount of F doping in the cladding glass.

5. The method of claim 1, including cutting the sintered soot body near both of its axial ends for allowing removal of the core glass from inside the cladding glass.

6. The method of claim 1, including treating the glass tube by grinding.

7. The method of claim 1, including treating the glass tube by smoothing its inside circumference.

8. The method of claim 1, including applying the first soot on the end of the starting member by reacting $SiCl_4$ as a precursor gas in a flame of a core torch, and directing the flame of the core torch toward the end of the starting member.

9. The method of claim 1, including applying the second soot on the circumference of the soot core by reacting $SiCl_4$ as a precursor gas in a flame of a cladding torch, and directing the flame of the cladding torch toward the circumference of the soot core.

10. The method of claim 9, including reacting $GeCl_4$ as a precursor gas in the flame of the cladding torch to obtain a desired amount of Ge doping in the cladding glass.

11. The method of claim 1, wherein the second soot applying step includes grading the density of the soot cladding to decrease from said second density at positions increasingly radially outward from the periphery of the soot core.

12. The method of claim 11, wherein the grading step is carried out so that the soot cladding has an average density that is less than that of the soot core.

* * * * *